US006301603B1

United States Patent
Maher et al.

(10) Patent No.: US 6,301,603 B1
(45) Date of Patent: Oct. 9, 2001

(54) SCALABLE AUDIO PROCESSING ON A HETEROGENEOUS PROCESSOR ARRAY

(75) Inventors: Robert Crawford Maher; Jeffrey Barish, both of Boulder, CO (US)

(73) Assignee: EuPhonics Incorporated, Boudler, CO (US)

( * ) Notice: Subject to any disclaimer, the term of this patent is extended or adjusted under 35 U.S.C. 154(b) by 0 days.

(21) Appl. No.: 09/024,793

(22) Filed: Feb. 17, 1998

(51) Int. Cl.[7] .................................................. G06F 9/00
(52) U.S. Cl. .............................. 709/105; 712/34; 712/35; 700/94
(58) Field of Search .................................... 709/105, 104; 712/34, 35, 28

(56) References Cited

U.S. PATENT DOCUMENTS

| 5,376,750 | 12/1994 | Takeda et al. ........................ 84/602 |
| 5,376,752 | 12/1994 | Limbris et al. ....................... 84/622 |
| 5,567,900 | 10/1996 | Higashi ................................ 84/602 |
| 5,584,034 | 12/1996 | Usami et al. ........................ 395/800 |
| 5,596,159 | 1/1997 | O'Connell ............................ 84/622 |
| 5,604,324 | 2/1997 | Kubota et al. ....................... 84/622 |
| 5,655,120 | * 8/1997 | Witte et al. .......................... 709/105 |
| 5,889,989 | * 3/1999 | Robertazzi et al. ................. 709/105 |
| 5,940,086 | * 8/1999 | Rentschler et al. ................. 345/503 |
| 5,991,808 | * 11/1999 | Broder et al. ....................... 709/226 |
| 6,009,507 | * 12/1999 | Brooks et al. ....................... 712/28 |

OTHER PUBLICATIONS

Linton, K.; Gould, L; Terepin, S.; Purvis, A.; "On the Re–Allocation of Processing Resources for Digital Audio Signal Processing", IEE Colloquium on Digital Audio Signal Processing 1991 7/1–7/4.*

* cited by examiner

Primary Examiner—Forester W. Isen
Assistant Examiner—Brian Pendleton
(74) Attorney, Agent, or Firm—Jennifer L. Bales; Macheledt Bales & Johnson LLP

(57) ABSTRACT

The present invention provides apparatus and methods which allow music synthesis and audio processing tasks to dynamically scale from a default processor to additional processors in a heterogeneous array of processors in a manner transparent to the user. A router running on one of the processors in the array knows or estimates the load on each processor, and dynamically allocates processing tasks based upon the current load on each processor and its capacity. Processing parameters are shared between all the audio processors to ensure that perceived audio quality is independent of where a task is running.

22 Claims, 7 Drawing Sheets

| Hardware Unit | Maximum Voices [A] | Currently Active Voices [B] | Voices Available [A-B] |
|---|---|---|---|
| # 1 | 24 | 24 | 0 |
| # 2 | 32 | 20 | 12 |
| # 3 | 16 | 0 | 16 |

FIGURE 7

| Hardware Unit | Load Limit | Current Loading | Available |
|---|---|---|---|
| # 1 | 100% | 6 voices @ 5% = 30%<br>3 special voices @ 8% = 24%<br>reverb effect = 8%<br>TOTAL = 62% | 38% |
| # 2 | 50% | 4 special voices @ 8% = 32% | 18% |
| # 3 | 80% | 0 | 80% |

FIGURE 8

SCALABLE AUDIO PROCESSING ON A HETEROGENEOUS PROCESSOR ARRAY

BACKGROUND OF THE INVENTION

1. Field of the Invention

The present invention relates to apparatus and methods for dynamically scaling audio processing tasks from a default processor to one or more additional processors which may be of a different type.

2. Description of the Prior Art

Many applications for personal computers require audio processing either for music synthesis or audio effects such as artificial reverberation and 3D localization. Audio is used for musical education, background for advertising, sound effects and musical accompaniment for computer games, and entertainment. Music synthesis offers advantages over the playback of prerecorded music. It is easier to modify the musical accompaniment in response to actions of the listener, for example by changing the tempo or the orchestration as the intensity of game play increases. Also, the control parameters for the synthesizer require a much lower bandwidth than streams of digitized audio samples. Similarly, adding audio effects during playback makes it easier to modify the effect in response to actions of the listener, for example by changing the apparent position of a sound in response to joystick manipulations.

The most common method for controlling music synthesis in a multimedia system is via MIDI (Musical Instrument Digital Interface) commands. MIDI represents music as a series of events, such as "note on," "note off," and "volume." MIDI organizes the synthesis process into sixteen logical channels, where each channel is assigned a particular "patch" (musical timbre). The stream of MIDI events is normally produced by an application such as a music sequencing program or game, but it can also be provided by an external controller such as a music keyboard. The music synthesizer responds to the MIDI stream to create the desired audio output. Synthesizers are normally able to synthesize some number of voices (often 32) at the same time. The MIDI standard permits these voices to have up to 16 different timbres.

The most common way to control audio effects processing is through Application Program Interfaces (APIs) provided as part of the operating system running on the PC (e.g., Microsoft Windows 95). For example, the DirectSound3D API controls an audio effect that makes it seem as if a sound is emanating from any location surrounding the listener. Audio effects processors are normally able to process some number of audio streams at the same time (often 8 for 3D positioning).

Audio processing in personal computers is accomplished either using hardware accelerator chips (supplied on add-on cards or on the mother board) or using the host CPU. Hardware accelerator chips can be based on fixed-function hardware designed specifically for audio processing or general-purpose digital signal processors that are programmed for audio processing. Hardware accelerators increase cost, particularly when they are designed to support worst-case signal processing requirements.

Using the host processor has the advantage of reducing cost and hardware complexity, but distracting the host processor with audio processing tasks slows the operation of a current application such as a game.

The computational requirements for audio processing often vary depending on the requirements of the application. For example, the number of voices of music synthesis required can vary from a few to 32, 64, or more. Similarly, the number of streams of 3D positioning can vary from 1 or 2 to 8, 16, or more. The current practice for implementing algorithms on hardware accelerators or the host CPU is to place an a priori limit on the number of signal processing tasks the algorithm will perform. Such a limit is required in a hardware accelerator to determine the hardware resources that need to be provided. In a host-based implementation, the limit is required to assure that some computational resources remain for the CPU to run the application, the operating system, and any other tasks it may be required to perform concurrently. Once a processor reaches its limit, the processor either ignores requests to perform additional tasks or it finds a way to shed tasks already running to make way for the new request.

A need remains in the art for apparatus and methods which allow music synthesis and audio effects processing to dynamically scale from a default processor to one or more additional processors which may not be of the same type—for example from a DSP to the host CPU—in a manner which permits the audio system to support more tasks as the need arises.

SUMMARY OF THE INVENTION

It is an object of the present invention to provide apparatus and methods which allow music synthesis and audio effects processing to dynamically scale from a default processor to additional heterogeneous processors, in a manner that is transparent to the user.

The present invention dynamically allocates audio processing tasks between two or more heterogeneous processors, for example a host processor such as might be found in a PC and a hardware acceleration unit such as might be found on a sound card in the PC. The audio processing load on each processor is determined and tasks are allocated based upon this determination. Each audio processor communicates with a common audio processing parameter data set to ensure that the sound quality is the same regardless of which processor is used.

In general, the goal of this invention is to optimally load the hardware acceleration unit(s), and only invoke the processing power of the host when the accelerator resources are used up—in other words, to keep the host as idle as possible while reserving its resources for cases in which the instantaneous processing load exceeds the accelerator capabilities.

It is important musically that the sound produced by the host processor and the hardware acceleration units be of identical quality so that the user is not aware of which resources are being used for processing. This "seamless" behavior requires that the processing engines running on the various processors implement the same algorithm despite differences in the architecture of the processors. It also requires that all processing engines receive the same audio processing parameters. Delivering the same audio processing parameters to all processing engines can be achieved by duplicating the synthesis and processing controls and parameters for the host and the accelerators, but this is inefficient in storage and access bandwidth. Instead, the present invention puts audio processing parameters in the memory of the host PC and permits the hardware accelerators to access these parameters via the bus access mechanisms found in contemporary multimedia systems (e.g., the "PCI bus" found in modern PCs).

The heterogeneous nature of the processor array results in differences in the time it takes each engine to produce audio output in response to control inputs (known as "processing latency"). The latencies of the various processors must be equalized to assure synchronization of the audio outputs.

The following is a partial list of key features of the present invention:
1) Configuration supports a host processor and a plurality of coprocessors.
2) Host determines allocation of audio tasks based upon load and available resources.
3) Preferred arrangement is to overflow to the host once the hardware accelerators are fully utilized.
4) Scaling of audio processing from one processor to others is seamless.
5) Host handles synchronization of processors.
6) Resources (such as host memory and D/A conversion) can be shared.
7) Supports autonomous audio processing units (host distributes commands to acceleration units).
8) Supports slave audio processing units (host manages all resource allocation of accelerators).

Apparatus according to the present invention dynamically allocates audio processing load between at least two heterogeneous audio processors, such as the host processor and a hardware acceleration unit. It includes means for determining the current audio processing load value for each processor, and means for allocating audio processing load among the processors dynamically, based upon the load values. Generally, a common audio information data set is provided and each processor has access to it.

Allocation of audio processing tasks among the processors may involve music synthesis voices and/or audio streams effects processing. If voices are allocated, they may be divided into groups according to timbre and different groups allocated to different processors. It is often useful to allocate all of the processor load to one processor (for example a hardware acceleration unit) before beginning to allocate load to other processors (for example the host processor).

A variety of methods may be used to determine the load values of the processors, including counting the voices or streams already allocated to each processor and estimating the load value based upon the number of voices, computing load figures for each musical note or effect and computing the load value of each processor based on the voices and effects allocated to it and the load figure for each voice and effect, or polling each processor for its load value.

The present invention includes means for determining a latency value for each processor, and means for selectively applying a delay to the audio processing allocated to each processor based upon the latency values of each processor.

BRIEF DESCRIPTION OF THE DRAWINGS

FIG. 7 is an example of a database for use with the embodiment of FIG. 1.

FIG. 8 is an example of a lookup table for use with the embodiment of FIG. 3.

DETAILED DESCRIPTION OF THE PREFERRED EMBODIMENT

Figure 1:
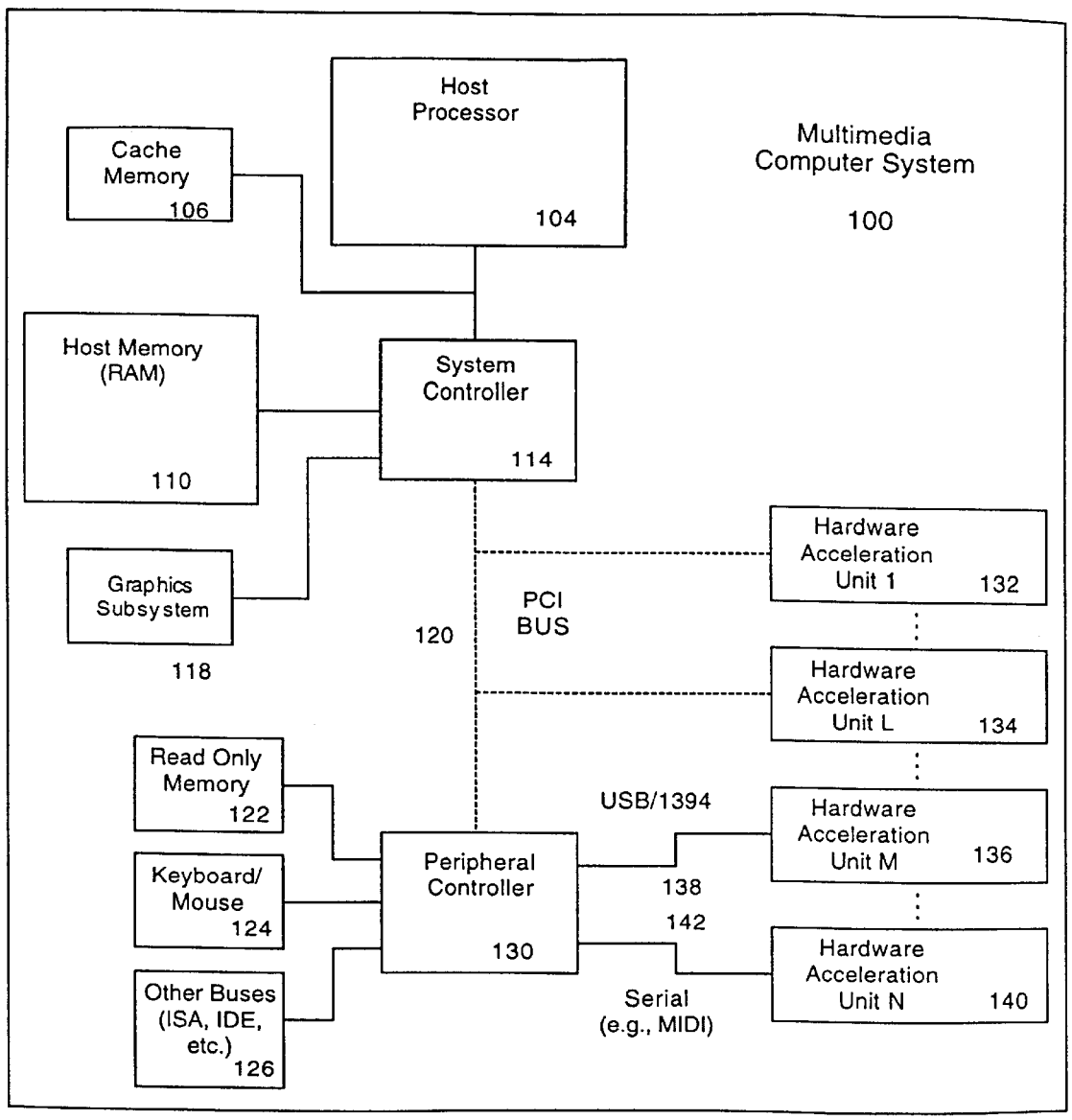
FIG. 1 is a block diagram of a multimedia computer system capable of dynamically allocating audio processing load according to the present invention.

FIG. 1 is a block diagram of a multimedia computer system 100 capable of dynamic and scalable audio processing. System 100 includes a host processor 104 and one or more hardware audio acceleration units 132, 134, 136, 140. Multimedia computer systems such as 100 typically also include cache memory 106, to improve performance, connected to processor 104. System controller 114 generally comprises a hardware chip that manages access to system memory among the host processor and peripheral processors. System controller 114 is connected to RAM memory 110 for running programs and the operating system, and a graphics subsystem 118 implemented in software or on a graphics card. Peripheral controller 130 is a protocol unit, generally comprising a chip, which controls relatively slow peripherals such as the keyboard. Peripheral controller 130 communicates with peripherals such as ROM bus 122, the keyboard and mouse bus 124 and other busses (such as IDE or ISA) 126. A PCI bus 120 (for example) connects system controller 114, peripheral controller 130, and possibly audio acceleration units and optional acceleration cards (not shown).

Hardware acceleration units 132, 134, 136, 140 may be connected to PCI bus 120, or to peripheral controller 130 via (for example) a serial bus 142 or a USB/1394 bus 138. The hardware acceleration units are typically able to act as bus masters, thereby allowing the accelerators to access host system memory 110 and other resources.

Hardware acceleration units 132, 134, 136, 140 may be fixed-function or programmable. In either case host processor 104 is able to control the acceleration units via a command stream such as MIDI or a proprietary communication scheme. It is therefore a feature of the present invention that host processor 104 determines the appropriate distribution of the synthesis and processing tasks across the available hardware resources.

Figure 2:
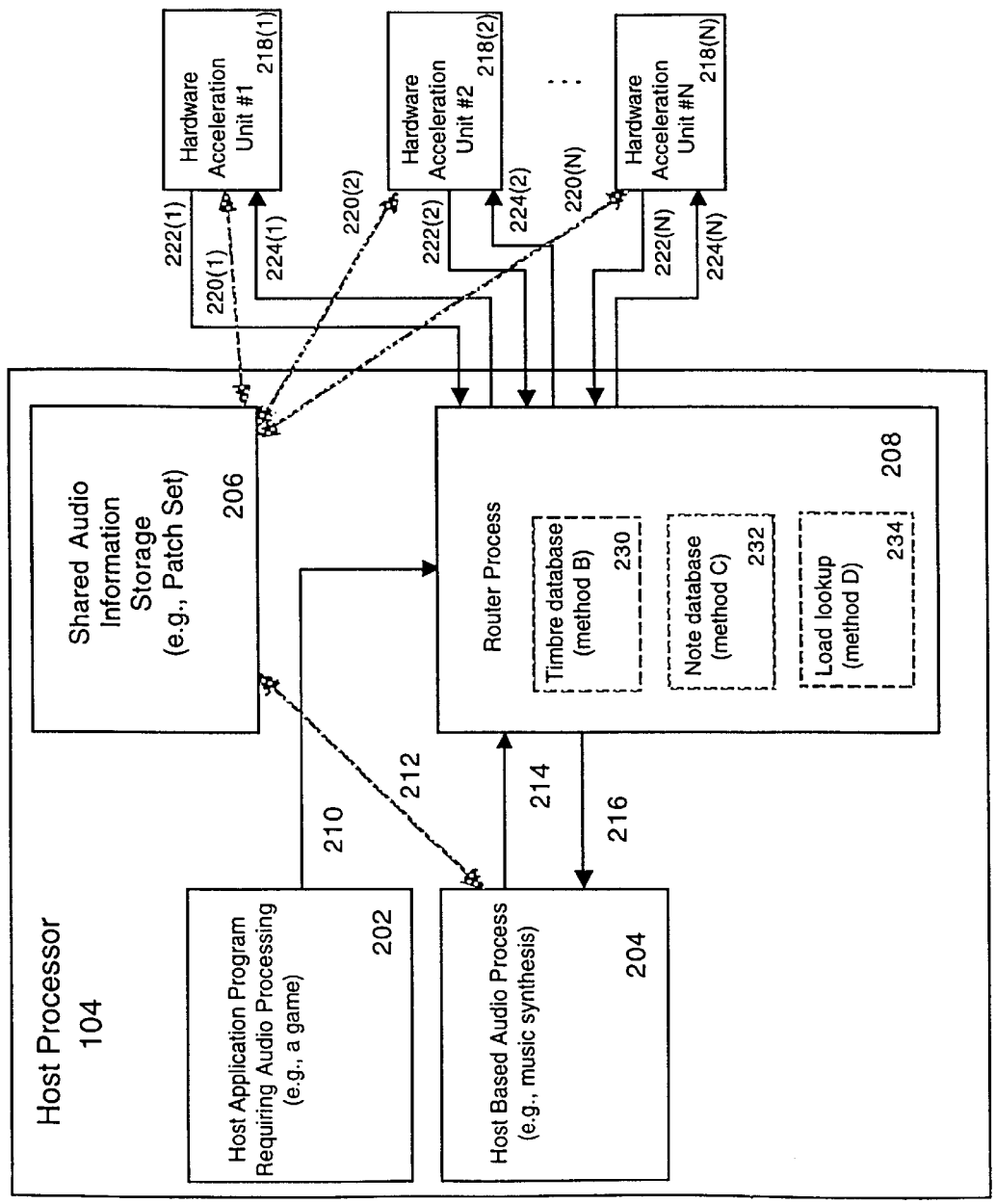
FIG. 2 is a block diagram showing the communication between the host processor and hardware acceleration units of FIG. 1 in more detail.

FIG. 2 is a block diagram showing the communication between the host processor 104 and hardware acceleration units 218(1), 218(2), 218(N). Host-based router process 208 performs a monitoring function (generally under the control of host processor 104) to determine the current load and available capacity of each hardware acceleration unit and of host based audio process 204. Based upon this information, router process 208 determines the allocation of any pending music synthesis or audio processing commands. In this manner, router process 208 may follow a variety of strategies to utilize optimally the available computational resources. For example, it is often desirable to utilize the hardware acceleration units 218 first, and only overflow tasks to the host audio process 204 when the hardware units are fully loaded.

All of the audio processing units, comprising hardware acceleration units 218 and host audio process 204, preferably communicate with a common, shared set of audio processing parameters (e.g. a patch set) 206 via lines 212, 220(1), 220(2), 220(N). This process is shown in more detail in FIG. 3. Host-based router process 208 receives audio data and control parameters from the host application program 202 (e.g. a computer game) requiring audio processing. Router 208 then allocates the audio processing load in a scalable manner among audio processing units 218, 204 via command streams 216, 224. In general, router 208 also receives information from audio processing units 218, 204 via request streams 214, 222, in order to assess the load on each processing unit.

Router 208 may adopt any of a variety of strategies for allocating audio processing load, depending upon the type of hardware acceleration units 218 available, the amount of processing power available in host processor 104, and other factors (e.g. competing tasks and task priority). A set of preferred strategies for allocating the computational resources among host audio process 204 and hardware acceleration units 218 is described below. Those skilled in the art will appreciate changes and additions to the preferred strategies that are within the spirit of this invention.

In a first preferred embodiment of the present invention, hardware acceleration units 218 are largely autonomous processors. Router 208 forwards particular commands to each hardware acceleration unit 218 (via command streams 224) to begin processing particular voices with particular sets of parameters. The actual manner in which the processing takes place is handled by the individual hardware acceleration units 218. One means for transmitting the host commands to the hardware acceleration units is via the MIDI protocol. In the preferred configuration the hardware acceleration units 218 and host audio process 204 share a common repository 206 of audio processing parameters located in host memory accessible via a bus arrangement (e.g., PCI).

According to the first preferred embodiment, with autonomous hardware acceleration units 218, router 208 operates as a timing and routing device that feeds the hardware accelerators and possibly a host audio process 204. The routing function can be accomplished without the need for user intervention or control. Several methods of dividing the processing load may be used in conjunction with this first embodiment:

Method A: Voice stream divided by processing function

In this routing method the decision as to which processing unit is to receive a particular audio processing task is based upon the required processing functions, such as the required synthesis patch or timbre. This method is of practical usefulness if the computation required to perform a particular audio process is best suited to a specific hardware acceleration unit 118 or to the host audio process 204. In music synthesis, for example, Router 208 would maintain or have access to a database 230 identifying which timbre is associated with each musical note, and route the note on and note off events accordingly.

Method B: Voice stream divided by counting voices (blind router)

In situations where one or more of the hardware acceleration units 118 is unable to provide load measurement information to router 208, router 208 may estimate the accelerator's current loading by keeping track of the number of active voices being processed by each accelerator 118. Since the maximum allocation of voices to a particular processing unit may vary, the host must maintain a database 232 of voice limits for each unit. An example of such a database is shown in FIG. 7

Method C: Voice stream divided by estimating load (better router)

Improving upon Method B, if a hardware acceleration unit 118 is unable to report its load condition, router 208 may obtain a better estimate of the accelerator's current loading by using a lookup table 234 of load figures for the supported range of timbres, effects processing, processor speed, and similar information. An example of such a lookup table is shown in FIG. 8. This method is an improvement over Method B because the processing load may vary from one voice to another, so simply counting voices is a sub optimum strategy. Router 208 attempts to provide an optimum load allocation using the estimated figures.

Method D: Voice stream divided by load reporting (smart router)

In the preferred configuration, each hardware acceleration unit 218 reports its current availability for additional audio process loading, via request streams 222. This report could contain information such as the processor's idle percentage. Router 208 tabulates the load information and routes new voices accordingly. This is a preferred arrangement, since router 208 is able to perform the routing function with the most reliable measurements of system resources.

Method E: Voice stream divided by a combination of load and priority

In a practical system it is likely that a combination of load information and predetermined processor priority provides the greatest benefit. For example, it is often desirable in practice to utilize hardware acceleration units 218 completely before utilizing host audio process 204. In other words, an important feature of the present invention is scalability to use the host audio process 204, but only when this is necessary to handle new voices after the hardware accelerator resources 218 are fully committed. This strategy is desirable because it makes use of the dedicated synthesis hardware to the greatest extent possible before making use of the shared host processor. It is useful to utilize the voice stream division technique of Method D, for example, combined with this strategy.

in a second preferred embodiment of invention, slave (non-autonomous) hardware acceleration units 118 are utilized. The advantage of slave units is that router 208 may register the capabilities and resources of each accelerator, then allocate the synthesis and audio processing tasks freely. Router 208 automatically determines the load on each processor without polling, since Router 208 is an integral part of the processing function. In this method, router 208 can view the slave accelerators as a voice pool in which the router sets up and maintains the control information. Each processing unit 218, 204 then pulls its audio processing parameters from a voice table 206 in host memory via the host bus 120 (e.g., PCl). In this manner the complexity of the hardware acceleration units 218 is reduced at the expense of increasing the complexity of router 208. This tradeoff is increasingly desirable as the speed and capability of host processors continues to improve with time.

In the configuration of FIG. 2 it is feasible for all or part of the audio processing parameters (synthesis and audio process control data) to be stored in shared host memory 206 and shared among some or all of the hardware acceleration units 218 according to the present invention. Similarly, the audio processing parameters could be stored elsewhere in host resources such as on a hard disk drive, compact disc, or network server. In this manner each of the audio processing units 218, 204 can create output signals that are indistinguishable from one another, since the audio processing parameters are shared in common. Moreover, the present invention facilitates the management of the audio processing parameters by router 208 since changes made to the audio processing parameters are shared by all of the active audio processors.

Figure 3:
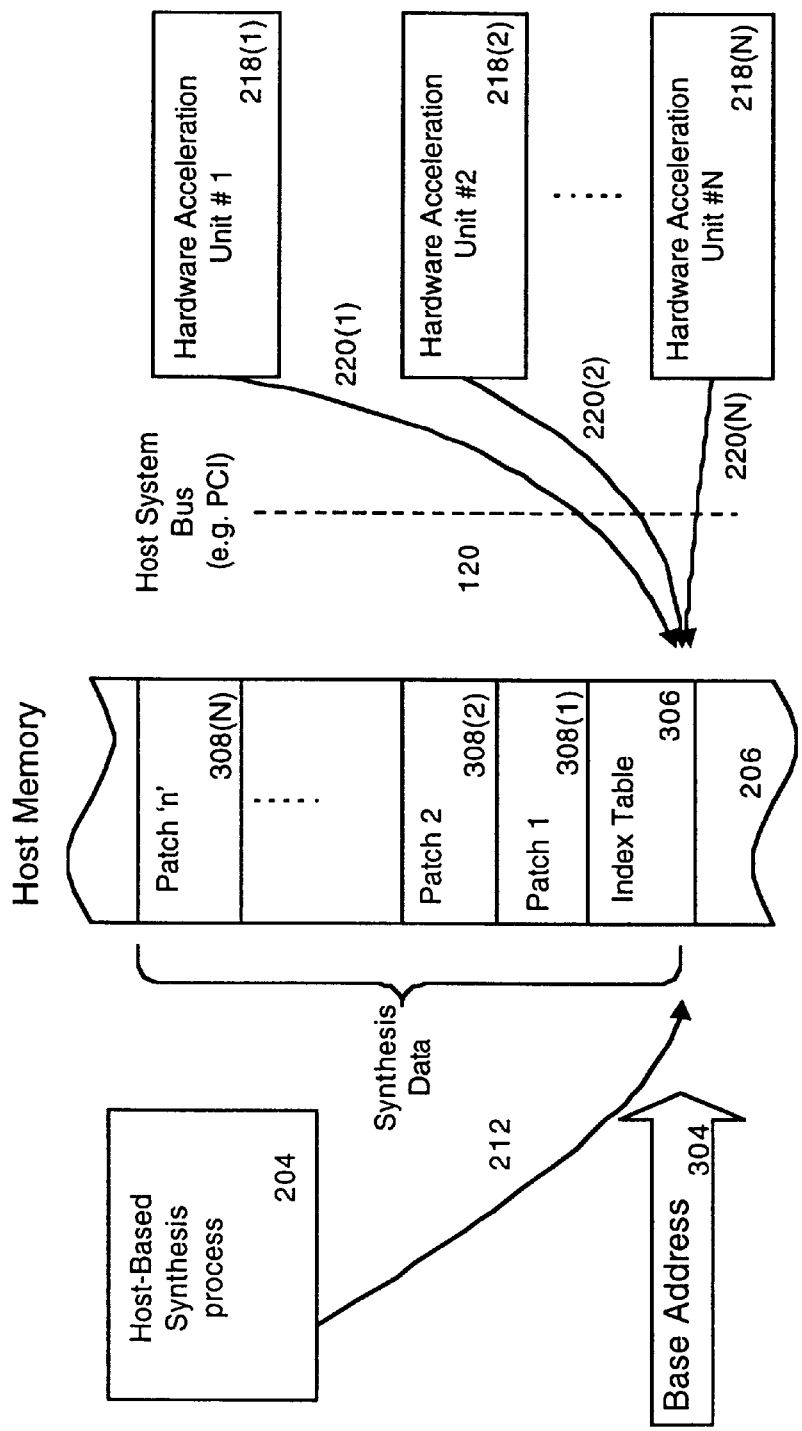
FIG. 3 is a block diagram showing communication between the host based audio process and the hardware acceleration units of FIG. 2 with the audio processing parameters in host memory.

FIG. 3 is a block diagram showing communication between the host based audio process 204 and the hardware acceleration units 218 of FIG. 2 with shared audio processing parameters 206 in host memory. To illustrate the advantages of the present invention, consider the repository of synthesis information, or patch set, located in host memory 206 as depicted in FIG. 3. Host audio process 204 and each hardware acceleration unit 218 are provided with the base address 304 of the patch set, so each unit is able to access the stored data directly via lines 212, 220. Any changes made to the patch set stored in 206 are shared by all the processors.

Audio processing parameter set 206 can contain a variety of data related to the required audio processing task. In the case of a wave table music synthesis process, the audio processing parameters would contain such things as the index table (address lookup) of each musical timbre, the digital audio samples comprising the recorded audio signal, the length of the attack and loop portions of the recorded signal, and the amplitude envelope (volume) settings. Similarly, in the case of an audio effects task, such as reverberation, the audio processing parameters would contain the gain settings and coefficients of the desired audio effect. Thus, by providing the means for sharing the audio processing parameters among the host process 204 and hardware acceleration units 218, it is possible to ensure a seamless and consistent presentation of the audio material, no matter which resource actually performs the processing.

Figure 4:
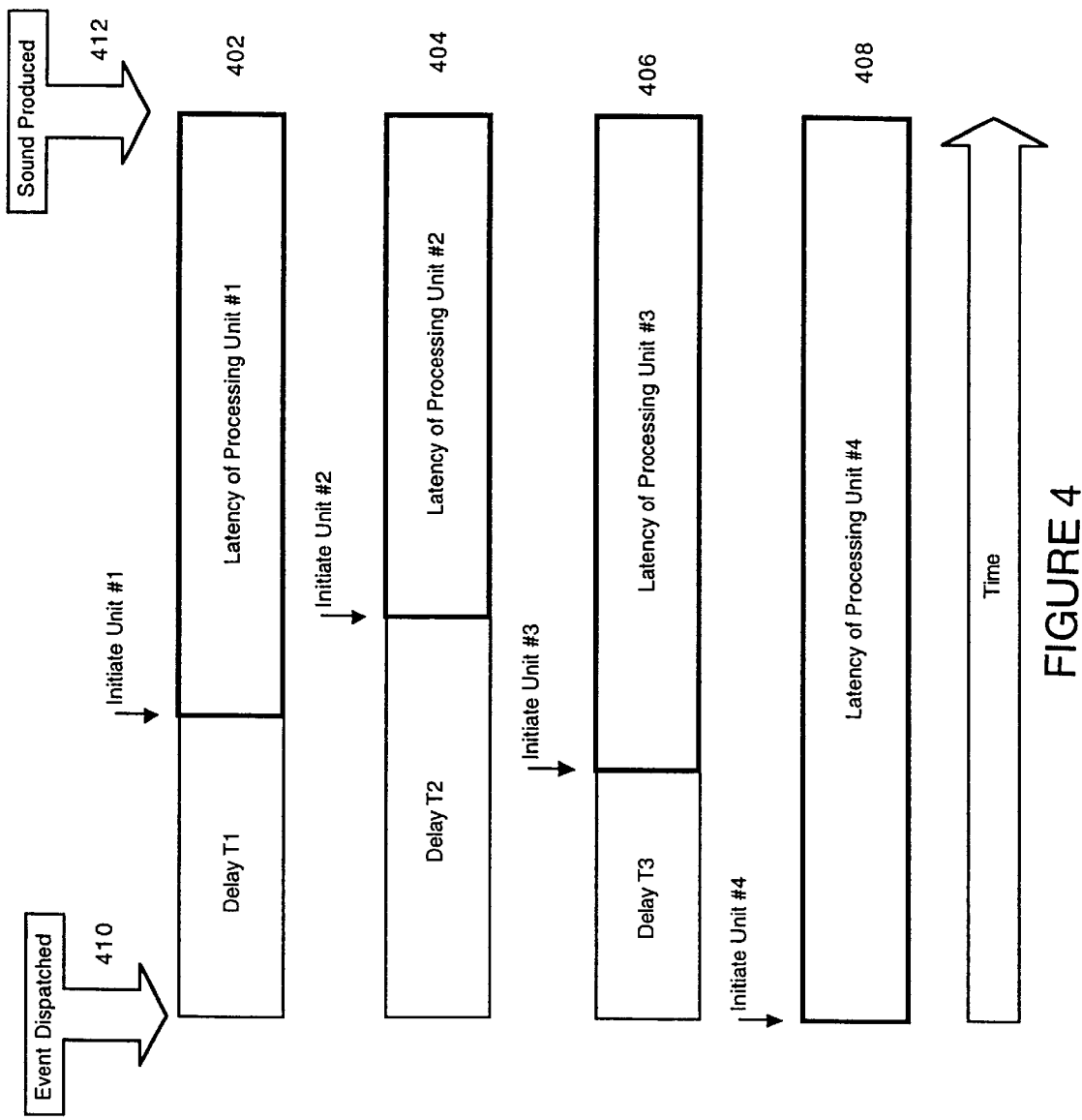
FIG. 4 is a time line showing equalization of latency among the host based audio process and the hardware acceleration units of FIG. 2.

FIG. 4 is a time line showing equalization of latency among host based audio process 204 and hardware acceleration units 218 of FIG. 2. Distributing tasks among the host audio process and the hardware acceleration units must be seamless. It is a feature of the current invention to provide a means for synchronization of the plurality of processors. Each processor can be characterized by a characteristic delay, or latency, between receiving a command to begin processing or synthesizing a musical note and the production of the digital audio samples due to that command. The latency is due to a combination of the time to decode the message, to perform the audio process computation, and to transfer audio samples to the data buffer that feeds the digital mixing or digital to analog conversion system.

Router 208 provides timing equalization by inserting sufficient delay to the commands feeding each synthesis unit to equalize the inherent delay of each processing unit, as depicted in FIG. 4. In this manner a group of separately processed sound events 410, intended to be heard simultaneously, are sent to each of the audio processing units at differing times so that the output signals occur simultaneously.

In the example of FIG. 4, timelines 402, 404, 406, 408 show that the latency of processing unit 4 is the longest, followed by processing unit 3, processing unit 1, and processing unit 2, in order. Thus (assuming a request for a simultaneous sound output 412 goes to each processing unit) no delay is necessary before router 208 sends the request to processing unit 4, a small delay is necessary before the request is sent to processing unit 3, a slightly longer delay is necessary before the request is sent to processing unit 1, and the longest delay is necessary before the request is sent to processing unit 2.

Figure 5:
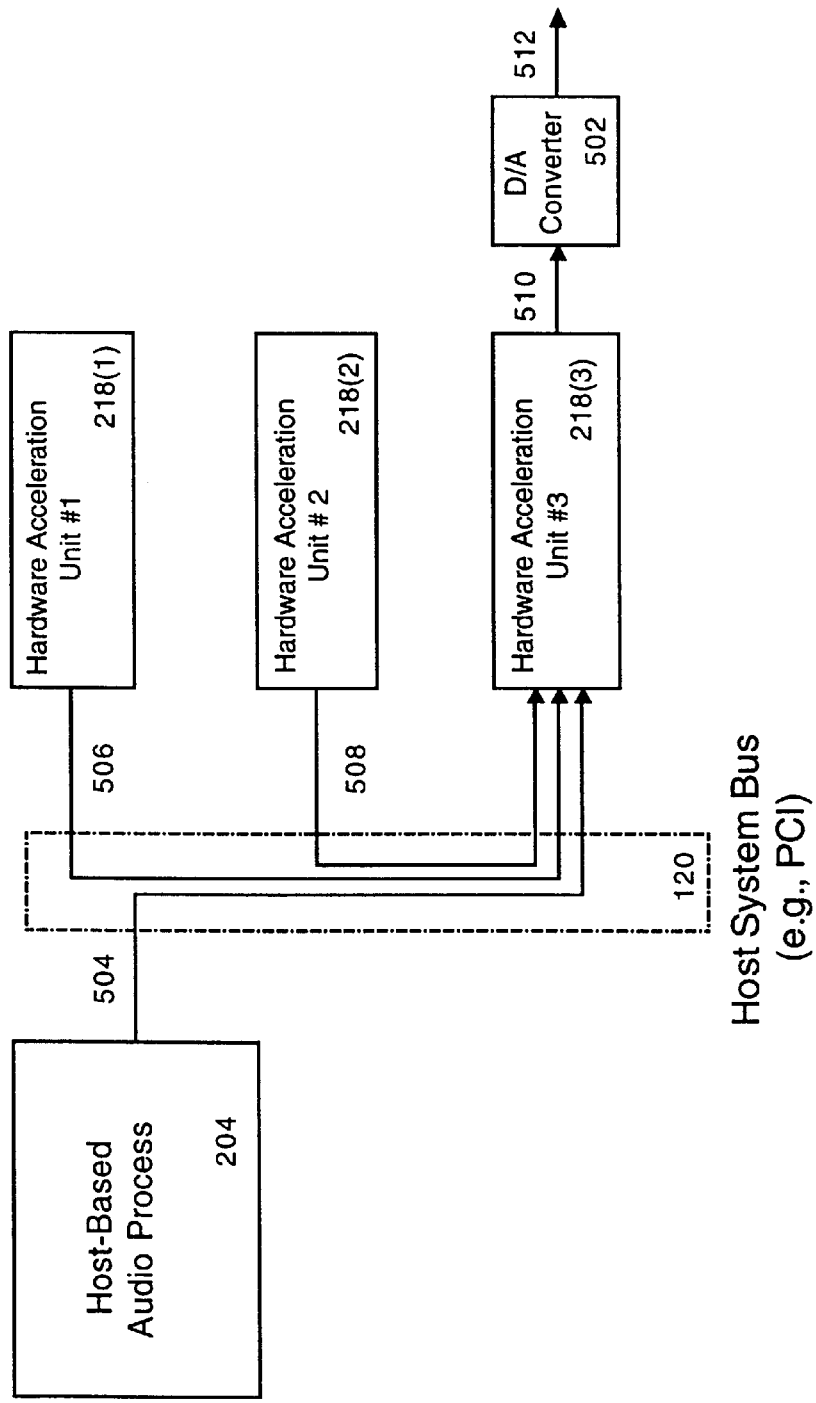
FIG. 5 is a block diagram showing signal routing for a first shared processing embodiment, wherein a hardware acceleration unit performs mixing of audio signals from other hardware acceleration units and the host based audio process.

FIG. 5 is a block diagram showing signal routing for a first output mixing embodiment, wherein a hardware acceleration unit 218(3) performs mixing of audio signals from other hardware acceleration units 218(1) and 218(2) and from host based audio process 204. It may be desirable in practice to share a particular audio processing task among some or all of the processing units. Processes such as sample rate conversion, audio effects, and D/A hardware mixing are often suitable for sharing. The particular routing scheme of FIG. 5 relies most heavily on hardware acceleration unit 218(3) to perform the signal mixing function. Mixed signal 510 is converted to an analog audio signal 512 by D/A converter 502.

Figure 6:
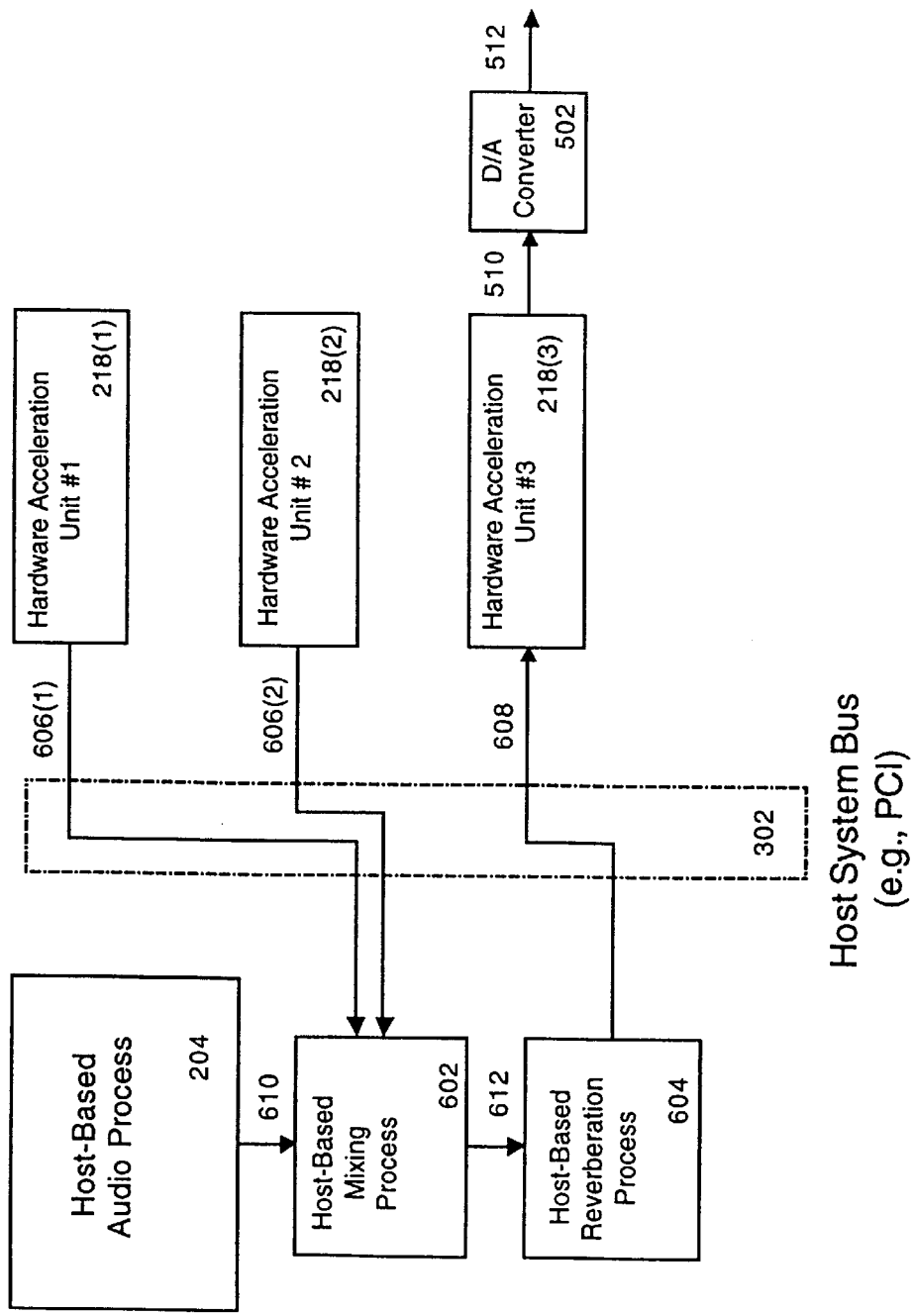
FIG. 6 is a block diagram showing signal routing for a second shared processing embodiment, wherein a host based mixing process performs mixing of audio signals from the hardware acceleration units and the host based audio process.

FIG. 6 is a block diagram showing signal routing for a second shared processing embodiment, wherein a host based mixing process 602 performs mixing of audio signals from the hardware acceleration units 218 (via lines 606) and host based audio process 204 (via line 610). A host based reverberation process 604 is also shown to illustrate other types of audio processing which could be performed on the combined audio output 612. FIGS. 5 and 6 are included to show the practical flexibility of the current invention, and numerous other arrangements in the spirit of this invention will be apparent to those skilled in the art.

While the exemplary preferred embodiments of the present invention are described herein with particularity, those skilled in the art will appreciate various changes, additions, and applications other than those specifically mentioned, which are within the spirit of this invention. For example, audio processing tasks required to support common operating system features, such as Microsoft's DirectSound™ DirectSound3D™, and DirectMusic™, can be assigned to hardware acceleration units according to a routing strategy embodied by this invention. In another practical configuration, the routing task could be performed by a hardware acceleration unit rather than by a host-based routing process. It may also be useful in practice to vary adaptively the method used to determine task routing according to the current loading of the host processor, rather than having the method predetermined and fixed. Similarly, the timing adjustments (latency equalization) of this invention can be updated dynamically to reflect changes in system configuration, such as changes of audio sample rate.

What is claimed is:

1. Apparatus for dynamically scaling audio processing among processors in a heterogeneous processor array, said array comprising a default processor and at least one additional processor, said apparatus comprising:

means for determining a current audio processing load value for each processor; and means for allocating audio processing load among the processors dynamically, based upon the load values;

wherein the means for allocating comprises:

means for dividing voices into groups according to timbre;

means for selecting a particular group of voices to allocate to an individual processor; and means for allocating the particular group of voices to the individual processor.

2. The apparatus of claim 1, further comprising:

a common audio processing parameter data set; and means for permitting each processor to access the common audio processing parameter data set.

3. The apparatus of claim 1 wherein the means for allocating further comprises means for allocating effects processing among the processors.

4. The apparatus of claim 1 wherein the means for allocating further comprises means for allocating all audio processing load to the default processor until the audio processing load value of the default processor reaches a predetermined level.

5. The apparatus of claim 1 wherein the means for determining comprises:

means for requesting a current load value for each processor; and means for receiving a current load value from each processor.

6. The apparatus of claim 1, further comprising:
means for determining a latency value for each processor; and
means for selectively applying a delay to allocated processing load based upon the latency values.

7. Apparatus for dynamically scaling audio processing among processors in a heterogeneous processor array, said array comprising a default processor and at least one additional processor, said apparatus comprising:
means for determining a current audio processing load value for each processor; and
means for allocating audio processing load among the processors dynamically, based upon the load values;
wherein the means for determining comprises:
means for counting the number of voices allocated to each processor; and
means for estimating the audio processing load value for each processor based upon the number of voices assigned to each processor.

8. The apparatus of claim 7, further comprising:
a common audio processing parameter data set; and
means for permitting each processor to access the common audio processing parameter data set.

9. The apparatus of claim 7 wherein the means for allocating further comprises means for allocating effects processing among the processors.

10. The apparatus of claim 7 wherein the means for allocating further comprises means for allocating all audio processing load to the default processor until the audio processing load value of the default processor reaches a predetermined level.

11. The apparatus of claim 7 wherein the means for determining comprises:
means for requesting a current load value for each processor; and
means for receiving a current load value from each processor.

12. The apparatus of claim 7, further comprising:
means for determining a latency value for each processor; and
means for selectively applying a delay to allocated processing load based upon the latency values.

13. Apparatus for dynamically scaling audio processing among processors in a heterogeneous processor array, said array comprising a default processor and at least one additional processor, said apparatus comprising:
means for determining a current audio processing load value for each processor; and
means for allocating audio processing load among the processors dynamically, based upon the load values;
wherein the means for allocating comprises means for allocating voices and effects processing among the processors; and
wherein the means for determining comprises a lookup table of load figures for each note and effect, and means for computing the audio processing load value for each processor based upon the voices and effects assigned to each processor and the load figure for each note and effect.

14. The apparatus of claim 13, further comprising:
a common audio processing parameter data set; and
means for permitting each processor to access the common audio processing parameter data set.

15. The apparatus of claim 13 wherein the means for allocating further comprises means for allocating all audio processing load to the default processor until the audio processing load value of the default processor reaches a predetermined level.

16. The apparatus of claim 13 wherein the means for determining comprises:
means for requesting a current load value for each processor; and
means for receiving a current load value from each processor.

17. The apparatus of claim 13, further comprising:
means for determining a latency value for each processor; and
means for selectively applying a delay to allocated processing load based upon the latency values.

18. Apparatus for dynamically allocating audio processing tasks between at least two processors, said apparatus comprising:
a host audio processor; and
at least one hardware acceleration unit connected to the host processor;
wherein the host processor includes:
means for determining current audio processing load values for the host processor and the hardware acceleration unit; and
means for allocating audio processing tasks among the host processor and the hardware acceleration unit dynamically, based upon the load values; and
wherein the means for allocating further comprises:
means for dividing voices into groups according to timbre;
means for selecting a first group of voices to allocate to the host processor and a second group of voices to allocate to the hardware acceleration unit; and
means for allocating the first group of voices to the host processor and the second group of voices to the hardware acceleration unit.

19. The apparatus of claim 18, further comprising:
a common database of audio processing parameters;
means for permitting the host processor to access the common database; and
means for permitting the hardware acceleration unit to access the common database.

20. The apparatus of claim 18 wherein the means for allocating further comprises means for allocating effects processing among the host processor and the hardware acceleration unit.

21. The apparatus of claim 18 wherein the means for allocating further comprises:
means for allocating all of the processing load to the hardware acceleration unit until its load value reaches a predetermined level.

22. The apparatus of claim 18, further comprising:
means for determining a latency value for the host processor and the hardware acceleration unit; and
means for selectively applying appropriate delay to processing tasks allocated to the host processor and the hardware acceleration unit based upon their respective latency values so that audio outputs produced by all processors are synchronized.

* * * * *